United States Patent [19]
Perkins

[11] 3,815,273
[45] June 11, 1974

[54] FISH HOOK TO FISH POLE RETAINER

[76] Inventor: John L. Perkins, 22021 Catalina Cir., Huntington Beach, Calif. 92646

[22] Filed: Aug. 29, 1973

[21] Appl. No.: 392,742

[52] U.S. Cl. ............................................. 43/25.2
[51] Int. Cl. .......................................... A01k 87/00
[58] Field of Search .................. 43/25.2, 25, 57.5 R

[56] References Cited
UNITED STATES PATENTS

| | | | |
|---|---|---|---|
| 404,747 | 6/1889 | Teed | 43/25.2 |
| 1,269,743 | 6/1918 | Richmond | 43/25.2 |
| 2,769,272 | 11/1956 | Goldman | 43/57.5 R |
| 3,141,258 | 7/1964 | Mayer | 43/57.5 R |
| 3,197,915 | 8/1965 | Staver | 43/57.5 R |
| 3,484,980 | 12/1969 | Wait | 43/25.2 |

*Primary Examiner*—Robert Peshock
*Assistant Examiner*—Daniel J. Leach

[57] ABSTRACT

A fish hook holder engaged on a fishing rod remote from the tip end thereof to releasably hold a flat recurvate fish hook on the end of a line extending freely from said tip end. The holder comprises a magnet with a flat pole surface disposed radially outward from the rod and adapted to orient and hold the hook in substantially flat engagement on the pole surface. A plurality of spaced hook engaging posts are disposed adjacent to and projecting outward from the pole surface to engage the hook and stop axial forward shifting of the hook relative to the pole surface and rod.

10 Claims, 11 Drawing Figures

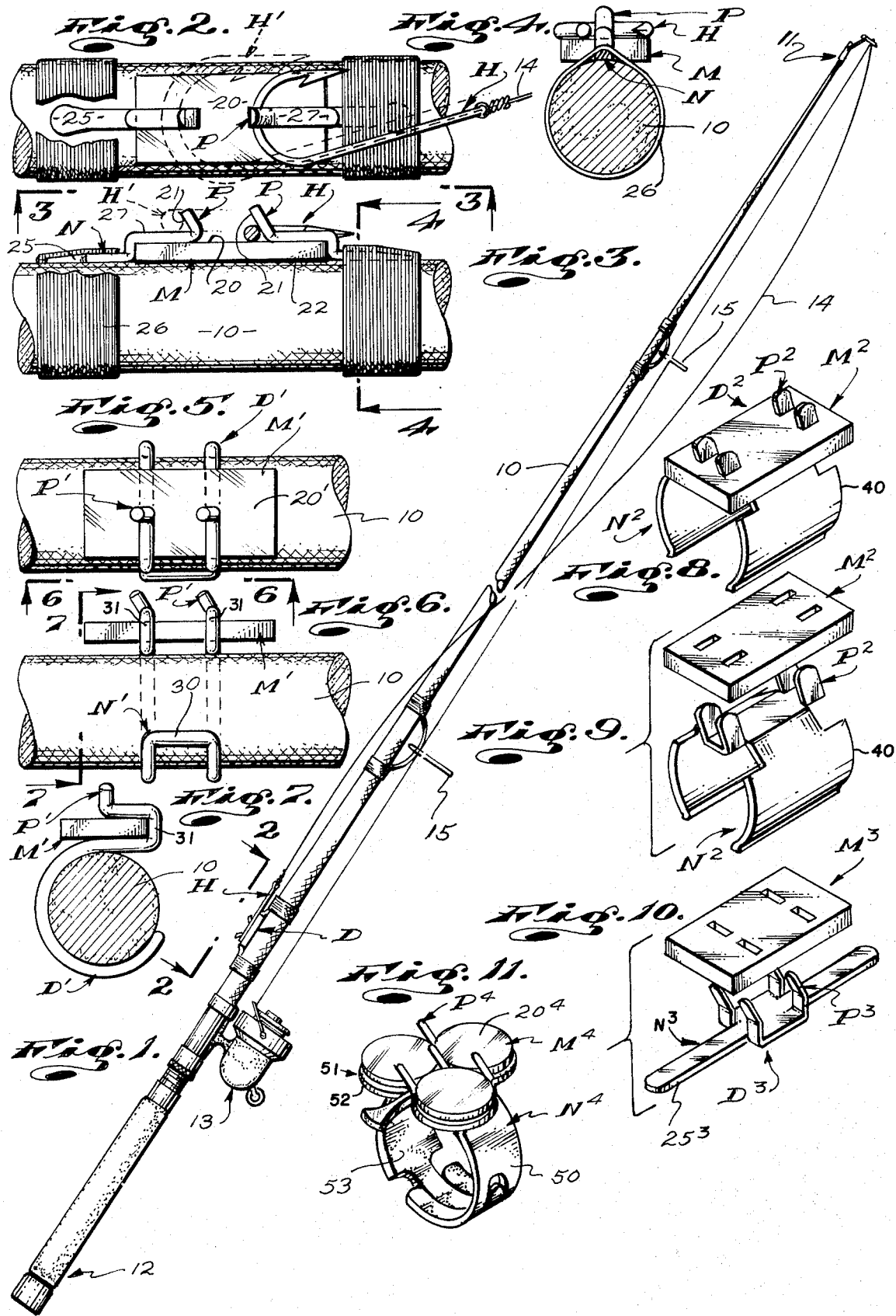

FISH HOOK TO FISH POLE RETAINER

This invention has to do with a safety and convenience device and is particularly concerned with a dveice for use in combination with a fishing pole, fishing line and fishing hook to releasably hold the hook in predetermined convenient location on or relative to the pole when the hook, at the end of the line, is not in use.

In the art and sport of fishing, it is common practice to employ, in combination, an elongate fishing rod, manually operated reel fixed to the rear butt end portion of the rod, an elongate fishing line engaged about the reel and extending longitudinally of the rod, through suitable line guides and continuing from the front tip end of the rod and a fish hook secured to the outer free end of the line. The noted combination of equipment is commonly referred to as a fishing rig, and will sometimes be referred to as such in the following.

The above basic assemblage of fishing equipment or fishing rig, its operation and methods of use are so well known to those familiar with the art to which the instant invention pertains, detailed description of the equipment and such consideration of its normal use need not be entered into.

When a fishing rig, as above defined, is not in use and during certain times of use, as when the hook is being or is about to have bait engaged thereon, the free end portion of the line with the hook at the end thereof is left free to swing about, creating a hazard and unreasonable risk of harm to the fisherman and others in the immediate area. In the situation noted above, the free end portion of the line is commonly sufficiently long to extend rearwardly from the forward tip end of the rod to the reel at the rear portion of the rod or in close proximity thereto and, where the fisherman who holds the rig at rear portion of the rod, can conveniently manually engage and hold the hook, for the purpose of baiting it, or the like.

In the past, and to avoid the above noted hazard, the prior art has provided small eyelets or the like on the rear portions of rods, near the reels and in and through which the hooks can be manually engaged to retain them. While such eyelets and the like may be suitable for securing hooks when fishing rigs are being stored or transported, they are unsatisfactory and their use is totally inconvenient for momentary securing of hooks while fishing and during the course of baiting the hooks.

Due to the small nature of the hook retaining eyelets such as referred to above, and due to the small and fine nature of fish hooks, the use of such eyelets is only convenient and useable by the nimblest and keen sighted fishermen.

An object and feature of my invention is to provide a device for use in combination with a fishing rig substantially as described, comprising, in combination, hook-engaging posts and magnetic holding means to retain hooks engaging the posts and engageable on the rod of a fishing rig in convenient location for manual engagement and disengagement of the hooks and posts.

It is an object and feature of my invention to provide a device of the character referred to in the noted combination, which is such that a hook of a fishing rig, substantially as described, can be easily, quickly, safely and effectively releasably secured to the rod, at a desired location, without manually and visually threading or engaging the hook through and about eyelets and the like.

Another object and feature of the present invention is to provide a device of the character referred to having a flat, magnetic surface on which a portion of a hook can engage and spaced posts projecting from the surface and against and/or about which portions of the hook engaged whereby the force of the magnet releasably maintains the hook engaged with the posts.

Yet another object and feature of the instant invention is to provide a device of the character referred to wherein magnetic force is utilized to maintain the hook engaged with posts which are of a size and disposition that they would not (without the applied force) otherwise establish reliable, effective, retaining engagement with a fish hook.

Still further, it is an object and feature of my instant invention to provide a device of the character referred to wherein the posts are inclined radially outwardly and axially forwardly relative to the longitudinal axis of the rod whereby hooks engaged therewith are effectively hooked thereby and caused to move into engagement with the magnetic surface of the device upon forward movement of the hooks or upon the application of forwardly, longitudinally outwardly applied forces on the hooks, when engaged with the posts, as when the fishing lines are moved to remove slack and establish tension between the hooks and the tips of the rods.

It is a feature of this invention to provide a device of the character referred to wherein the posts need only project from the magnetic surface a distance greater than the radial extent of the cross-section of the stock from which the hooks are established and preferably project a distance substantially equal to the diametric extent of the stock from which the largest and heaviest hooks normally used in or with the fishing rigs with which the device is to be related.

It is an object of my invention to provide a device of the character referred to having mounting means engageable with a related fishing rod whereby the device can be effectively related to and be made a part of the combination establishing the fishing rig.

An object and feature of the invention is to provide mounting means of the character referred to whereby the device can be permanently fixed to a related rod or whereby the device can be releasably engaged with a related rod and can be adjusted circumferentially and longitudinally of the rod as desired or as circumstances require.

The foregoing and other objects and features of my invention will be apparent and will be understood from the following detailed description of preferred forms and embodiments of the invention throughout which description reference is made to the accompanying drawings, in which:

FIG. 1 is a view of a fishing rig with my invention related thereto;

FIG. 2 is a view of the structure shown in FIG. 1 and taken substantially as indicated by line 2—2 on FIG. 1;

FIG. 3 is a view taken as indicated by line 3—3 on FIG. 2;

FIG. 4 is a view taken as indicated by line 4—4 on FIG. 3;

FIG. 5 is a view similar to FIG. 2 showing another form of my invention;

FIG. 6 is a view taken as indicated by line 6—6 on FIG. 5;

FIG. 7 is a view taken as indicated by line 7—7 on FIG. 6;

FIG. 8 is an isometric view of another form of my invention;

FIG. 9 is an exploded view of the structure shown on FIG. 8;

FIG. 10 is a view similar to FIG. 9 with slight structural modifications; and

FIG. 11 is an isometric view of yet another embodiment of the invention.

Referring to the drawings, FIG. 1 shows a typical sport fishing rig which rig includes an elongate fishing rod 10 with forward tip end 11 and a rear butt end portion 12. A manually operable fishing reel 13 is engaged on the rear, butt end portion of the rod in fixed position, and carries an elongate fishing line 14 that extends forwardly from the reel through longitudinally spaced line guides 15 on the rod and thence freely from the tip end of the rod. The forward free end of the line 14 is provided with and carries a fish hook H.

The fish hook holding device D that I provide is shown engaged with the rod 10 at a convenient location and disposition forward of the reel 13 and is shown engaged with the hook H on the forward end of the line 14 which is shown extending rearwardly from the tip 11 of the rod and substantially parallel therewith.

The device D is located so that it occurs at the side of the rod which is normally disposed upwardly and/or toward the face of the fisherman, to be in plain view and is spaced on the rod, forward of the reel so that when the rig is carried by one hand of the fisherman, engaged with the butt portion of the rod in close proximity to the reel, the device is conveniently accessible to the other, free, hand of the fisherman.

It is to be noted that ordinary or conventional fish hooks are established of ferrous metal and are such that they are subject to being effectively held by a magnetic field when brought into the effect of such a field.

The device D that I provide, in the several forms and embodiments of the invention, includes a plate-like magnet M with a substantially flat supporting pole surface 20 disposed substantially radially outwardly relative to the longitudinal axis of the rod 10; a plurality of spaced posts P projecting from the surface 20 and mounting means N to mount the device on the rod. The posts P are preferably spaced apart longitudinally and are inclined radially and rearwardly relative to the longitudinal axis of the rod 10 and such that they define radially inwardly and forwardly inclined, hook engaging, rear sides or edges 21 converging with the surface 20 of the magnet.

The posts P are of limited longitudinal extent and extend or project out from the surface 20 of the magnet M a distance which is not intended or likely to establish such full and extensive engagement with a hook H as to assure retentive post to hook engagement independent of the effect of the magnet M, but to project a sufficient extent so that by the senses of sight and/or touch a hook can be easily and quickly related thereto.

At this time, it is important to note that the size or extent of the posts, as provided by the present invention, is a matter of degree which, while difficult to particularly specify, is nevertheless a matter of considerable importance in the establishing of a most effective fish hook holding device. If the posts are less in extent than the radial extent of the round wire stock from which a related hook H is established, the posts would be ineffective to retain the hook since upon the application of forwardly disposed forces on and through the hook, the hook would tend to ride freely over the posts and become disengaged. If the posts are substantially greater in extent than the diametric extent of the stock from which a related hook H is established, the required manual manipulation of the hook required to engage the hook with the posts is increased and complicated to a notable and material extent. When excessively long or extensive posts are employed, the senses of touch and of sight must both be employed and greater dexterity and expenditure of more time must be exercised and expended to effect hook to post engagement.

In carrying out of my invention, it is an object and a feature thereof to provide posts of an extent or length which is such that they do not create a major obstruction to the substantially free manual movement of a related hook H into engagement with the surface 20 of the magnet M and such that when the hook is moved into engagement with that surface of the magnet M, and is held in such engagement thereof, the posts are of sufficient extent to engage and hold the hook against forward movement on and/or relative to the magnet surface.

In light of the above, and in accordance with the preferred carrying out of my invention, the posts P project out from the surface 20 of the magnet M a distance which is substantially equal to the diametric extent of the stock from which the largest and heaviest size of hook likely to be made and used with the fishing rig.

In FIG. 2 of the drawings, the hook H shown in solid lines is an intermediate size hook, while the hook H' shown in dotted lines is intended to illustrate the largest size hook that might be used in the preferred carrying out and use of the invention.

The area and/or dimensions of the surface 20 of the magnet M is preferably greater than one-half the major lateral dimension of the hook H and is preferably at least two times greater in longitudinal extent than its lateral extent so that when the hook H is brought into contact therewith, the force of the magnet, across the pole surface 20 thereof, draws the hook inwardly, turning the hook so that its plane of curvature is in a plane parallel with the surface 20 and so that a sufficient longitudinal extent of the hook is engaged and held by the magnet to retain the hook disposed for engagement with one of the posts.

It is important to note that the magnet not only holds the hook engaged on a post but operates to orient and hold the hook in proper disposition for initial and sustained engagement with the post.

It has been found that a single post is inadequate for effective and satisfactory operation of my invention as it requires that the user of the device seek and locate the post and deliberately arrange the hook in engagement therewith. By providing two or more posts in longitudinal spaced relationship on or with an elongated magnet, it has been found and determined that upon moving a hook into engagement with the magnet at and about the central portion thereof results in substantial automatic engagement of the hook with one of the posts. A single post requires specific orientation and placement of the hook relative to the post, which requires deliberate, dexterous manipulation of the hook whereas two or more spaced posts only requires general, unprecise positioning of the hook relative to the magnet, with little deliberation, dexterity and/or manipulation to effect hook to post engagement.

As a result of the noted radially outward and rearward inclination of the posts, when the hook H is urged forward as by tensioning of the line 14, the forwardly and inwardly inclined rear edges of the post with which the hook is engaged directs and urges the hook toward the magnet M and prevents the hook from moving forwardly and riding over the post to become disengaged and free.

In the form of the invention shown in FIGS. 1 through 4 of the drawings, the device D includes a flat, elongate substantially rectangular, plate-like magnet with a flat supporting pole surface 20 disposed radially outward relative to the axis of the rod 10 with which the device is related. The magnet M is arranged with a major longitudinal axis parallel with the axis of the rod 10 and has an inner surface 22 in bearing supporting engagement with the exterior surface of the rod. The rod 10 is, in accordance with common practice, round in cross-section.

The device D next includes a pair of short radially outwardly and rearwardly inclined posts P with rear inclined hook engaging edges 21. The posts P occur on the central radial plane through the magnet M and are spaced apart longitudinally of each other and from the ends of the magnet substantially equal distances; that is, the front and rear posts are spaced at or near the front and rear ends of the central one-third of the magnet.

The device D next includes mounting means N to secure the device D to the rod 10. Means N also serves to mount the posts. The means N includes front and rear, straight, elongate, metal tangs 25 projecting forwardly and rearwardly from the ends of the magnet M in flat bearing engagement with the surface of the pole 40 and bound to the pole by tape or thread wrappings 26. The ends of the tangs at the ends of the magnet M are integrally joined with retainer portions 27 which extend upwardly and thence longitudinally inwardly toward the related posts P and are fixed to the ends and top surface of the magnet by an epoxy cement or the like. The posts P are established by integral, upwardly bent extensions on the portions 27, as illustrated in the drawings.

In the form of the invention shown in FIGS. 5 through 7 of the drawings, the magnet M' and the posts P' are similar to the magnet M and posts P in the first form of the invention.

The mounting means N' in this second form of the invention is a spring clip-type mounting means established by a U-shaped spring wire clip 30 formed to yieldingly engage about the rod 10.

The legs of the U-shaped clip extend laterally beneath the magnet M' to support the magnet and have recurvate end portions 31 that extend about an edge of the magnet across the surface 20' thereof, to embrace and hold the magnet. The posts P' are formed integrally at the ends of the portions 31 by suitably bent and formed extensions of said portions 31, as clearly illustrated in the drawings.

The portions 31 are preferably cemented with the magnet.

With this second form of the invention, it will be apparent that the device D' can be engaged and removed from the rod 10 and can be adjusted longitudinally and circumferentially of the rod as desired, or as circumstances require.

In FIG. 8 and FIG. 9 of the drawings I have shown yet another form of the invention which includes mounting means $N^2$ in the form of a split ring or band 40 established of ribbon spring stock and adapted to be yieldingly engaged about a fishing rod. The band 40 has two pairs of laterally and longitudinally spaced, inclined posts $P^2$ established of cut and bent or formed portions of the band. The magnet $M^2$ is similar to the magnets M and M', but is provided with slot-like apertures through which the posts $P^2$ extend to project from the top pole surface $20^2$ of the magnet, as shown in the drawings.

The magnet and band can be cemented together and/or can be retained in assembled relationship by twisting the upper portions of the posts, as is common practice in the assembling of sheet metal structures.

In FIG. 10 of the drawings, I have shown an exploded view of a structure similar to the form of the invention shown in FIGS. 8 and 9, except that the mounting means $N^3$ includes tangs $25^3$, similar to the tangs 25 in the first form of the invention, rather than the spring clip type means shown in FIGS. 8 and 9.

Finally, in FIG. 11 of the drawings, I have illustrated a form and embodiment of my invention in the nature of a finger ring having a split malleable metal band 50 establishing pole engaging mounting means $N^4$, a crown 51 with one or more receptacles 52 in which magnets $M^4$ with flat pole surface $20^4$ are set, as by cement and a plurality of upwardly and axially inclined posts $P^4$ on the crown, about the magnet or magnets and projecting above the plane of the surfaces $20^4$ of the magnets.

The inside surface 53 of the band 50 can be coated with contact adhesive to prevent movement of the device relative to the rod.

This last form of the invention lends itself to the (investment casting) mass production procedures employed in the costume jewelry art and is such that the device $D^4$ can be mass-produced inexpensively and in attractive ornamental designs, such as the shamrock design illustrated.

In practice, the magnets M can be formed of ferrous nickel alloy 5 or can be ceramic magnets, as required or desired.

It is to be understood and will be apparent that in practice, the possible structural embodiments of my invention are numerous and that the several forms of the invention illustrated and described above are only illustrations of certain preferred, basic structural forms in which the invention can be practiced.

Having described only typical preferred forms and embodiments of my invention, I do not wish to be limited to the specific details herein set forth, but wish to reserve to myself any variations and/or modifications that may appear to those skilled in the art and which fall within the scope of the following claims:

Having described my invention, I claim:

1. In combination, an elongate fishing rod with a front tip portion with longitudinally spaced line guides and a manually engageable rear butt portion, a manually operable fishing reel secured to said butt portion, an elongate fishing line engaged with the reel with a forwardly extending intermediate portion extending longitudinally of said tip portion through said guides and a lead portion with a free end extending rearwardly from the forward end of said intermediate portion and said tip portion substantially parallel with said tip portion, a ferrous metal fish hook with a substantially straight elongate shank portion having an end fixed to said free end of the line to extend substantially rearwardly therefrom and a laterally and thence forwardly extending recurvate hook portion continuing from the other end of the shank, a hook holding device to releasably retain said hook in predetermined position relative to the rod and including a magnet adjacent to a side of the rod in predetermined spaced relationship with said reel and having a flat hook supporting pole surface disposed substantially radially outward relative to the axis of the rod and on a plane substantially parallel with the plane of the recurvate portion of said hook, a plurality of posts adjacent to and projecting from the plane of said pole surface and engageable with adjacent portions of said hook when said hook is engaged on said pole surface and held by the flux of the magnet and mounting means mounting said magnet on the rod.

2. A structure as set forth in claim 1 wherein said posts are spaced longitudinally relative to the longitudinal axis of the rod.

3. A structure as set forth in claim 1 wherein said posts are spaced longitudinally relative to the longitudinal axis of the rod, project outwardly from the pole surface a distance greater than one-half the cross-sectional extent of the fish hook and are inclined radially outwardly and rearwardly relative to the axis of the rod.

4. A structure as set forth in claim 1 wherein said mounting means includes elongate tangs projecting forwardly and rearwardly from the magnet adjacent to the rod and wrappings about the rod and overlying the tangs.

5. A structure as set forth in claim 3 wherein said mounting means includes elongate tangs projecting forwardly and rearwardly from the magnet adjacent to the rod and wrappings about the rod and overlying the tangs.

6. A structure as set forth in claim 1 wherein said mounting means includes curved spring metal parts in fixed relationship with said magnet and in yielding pressure engagement with and about the rod.

7. A structure as set forth in claim 3 wherein said mounting means includes curved spring metal parts in fixed relationship with said magnet and in yielding pressure engagement with and about the rod.

8. A structure as set forth in claim 1 wherein said mounting means includes curved malleable metal parts in fixed relationship with said magnet and urged and formed into holding engagement with and about the rod.

9. A structure as set forth in claim 3 wherein said mounting means includes curved malleable metal parts in fixed relationship with said magnet and urged and formed into holding engagement with and about the rod.

10. A structure as set forth in claim 1 wherein the magnet is segmented, said mounting means comprises a rod engaging band with a crown portion supporting the magnet segments and from which said posts project.

* * * * *